US007877951B2

(12) United States Patent
Jacobsen

(10) Patent No.: US 7,877,951 B2

(45) Date of Patent: Feb. 1, 2011

(54) CAULK FREE WINDOW TRIM

(76) Inventor: Rodney Allen Jacobsen, 548 Striped Moss St., Roseville, CA (US) 95678

( * ) Notice: Subject to any disclaimer, the term of this patent is extended or adjusted under 35 U.S.C. 154(b) by 555 days.

(21) Appl. No.: 10/938,428

(22) Filed: Sep. 10, 2004

(65) Prior Publication Data

US 2006/0053708 A1 Mar. 16, 2006

(51) Int. Cl.

*E04D 1/36* (2006.01)
*E06B 1/04* (2006.01)
*E04C 2/38* (2006.01)
*F16J 15/10* (2006.01)

(52) U.S. Cl. .......................... 52/717.01; 52/211; 52/58; 277/650; 277/921

(58) Field of Classification Search ................... 52/108, 52/204.53, 204.5, 204.55, 717.01, 58, 208, 52/214, 287.1, 459, 211; 277/637, 630, 644, 277/650, 906, 921
See application file for complete search history.

(56) References Cited

U.S. PATENT DOCUMENTS 2,724,876 A * 11/1955 Chagnon ................... 49/493.1
3,184,808 A * 5/1965 Lyon ......................... 49/493.1
4,497,137 A * 2/1985 Nelson ...................... 49/496.1
5,408,784 A * 4/1995 Wruck et al. ............. 49/489.1
5,590,496 A * 1/1997 Martin et al. ................ 52/213
5,596,851 A * 1/1997 Ting ............................ 52/211
5,784,834 A * 7/1998 Stutzman ................... 49/475.1
6,360,489 B1 * 3/2002 Burge et al. ................ 49/496.1
6,772,561 B1 * 8/2004 Berger, Jr. .................. 49/496.1

* cited by examiner

*Primary Examiner*—Richard E Chilcot, Jr.
*Assistant Examiner*—Ryan D Kwiecinski
(74) *Attorney, Agent, or Firm*—Tutunjian & Bitetto, P.C.

(57) ABSTRACT

There is provided a caulk free window trim for use with a replacement window in a wall having a window jam. The window jam has a jam liner. The window trim includes a vertical rigid first member for disposing against a portion of the replacement window. An angled flexible second member extends away from a predetermined intermediate position on the vertical rigid first member and above an uppermost portion of the vertical rigid first member in contact with a portion of the jam liner to prevent air from infiltrating into the wall between the jam liner and the replacement window. No caulking or painting is required because the angled flexible second member together with the vertical rigid first member seals any minor gaps and produces an attractive finished product.

23 Claims, 3 Drawing Sheets

CAULK FREE WINDOW TRIM

FIELD OF THE INVENTION

The present Invention relates generally to window trims and, more particularly, to caulk free trims.

BACKGROUND OF THE INVENTION

Vinyl windows that are installed as replacements for original windows in an existing structure are typically manufactured to a size that is smaller in height and width than the window that it is replacing. This allows for the replacement window to fit inside of the main frame of the original window. Once installed this way, trim pieces are required around the interior perimeter of the new window to cover any wide gaps between the edge of the window and the finished surface of the original wall opening. These trim pieces are typically wood moldings that are cut to size and nailed into place or vinyl trim that is cut to size and attached to the window frame. Caulking is then applied to the intersection of the trim pieces and the finished wall surface to seal any minor gaps and create a finished look to the installation.

The problem with this type of installation has to do with the unattractiveness of the caulking. It can be difficult to apply, can tend to attract dirt, can crack from movement of the window, and usually requires additional finish work (painting) to be complete.

FIG. 1 is a sectional view showing a typical vinyl replacement window 11 installed within an existing aluminum window frame 12 attached to a wall 10. A jam liner 14 is attached to the perimeter of the window opening. The dash-dot circle 13 indicates the location of prior art in relationship to the entire wall-window assembly.

FIG. 2 is a sectional detail view of dash-dot circle 13. In this view, a flat vinyl trim piece 16 has been attached to the interior surface of the vinyl replacement window 11 with a double-sided adhesive tape 17. The flat vinyl trim 16 is positioned so that its outer edge comes in contact with jam liner 14 effectively covering the gap between the replacement window 11 and the jam liner 14. Caulking 15 is then applied at the intersection of flat trim 16 and jam liner 14 to seal and hide any minor gaps. The problem with this is that the caulking can be difficult to apply smoothly, can tend to attract dirt, can crack from window movement and usually requires painting to have a finished look.

SUMMARY OF THE INVENTION

These and other drawbacks and disadvantages of the prior art are addressed by the present invention, which is directed to caulk free trims. Advantageously, the present invention provides a trim piece that covers wide gaps in the above-described window installation and does not require caulking to seal the minor gaps.

According to an aspect of the present invention, there is provided a caulk free window trim for use with a replacement window in a wall having a window jam. The window jam has a jam liner. The window trim includes a vertical rigid first member for disposing against a portion of the replacement window. An angled flexible second member extends away from a predetermined intermediate position on the vertical rigid first member and above an uppermost portion of the vertical rigid first member in contact with a portion of the jam liner to prevent air from infiltrating into the wall between the jam liner and the replacement window.

According to another aspect of the present invention, there is provided a caulk free window trim for use with a replacement window in a wall having a window jam. The window jam has a jam liner. The window trim includes a vertical rigid first member for covering an opening between the replacement window and the jam liner and extending past the opening and over a portion of the replacement window. An angled flexible second member extends away from a predetermined intermediate position on the vertical rigid first member and above an uppermost portion of the vertical rigid first member in contact with a portion of the jam liner to form an arcuate-shaped edge from the intermediate position on the vertical rigid first member to the position on the jam liner to prevent air from infiltrating into the wall between the jam liner and the replacement window.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION OF PREFERRED EMBODIMENTS

The present invention is directed to a caulk free trim. The caulk free window trim may be an elongated co-extruded shape that includes a rigid main body with a flexible fin positioned near one edge. An adhesive strip on the backside of the main body allows for attachment of the trim to the interior perimeter of a newly installed replacement window. Proper placement and appearance of the flexible fin on the trim is aided by the flexible fin being positioned at a predetermined distance from one edge of the rigid body. This positioning of the flexible fin allows for a proper and consistent curvature of the flexible fin against a window jam liner when the rigid main body of the trim is butted up firmly against the same jam liner. No caulking or painting is required because the flexible fin seals any minor gaps and produces an attractive finished product.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
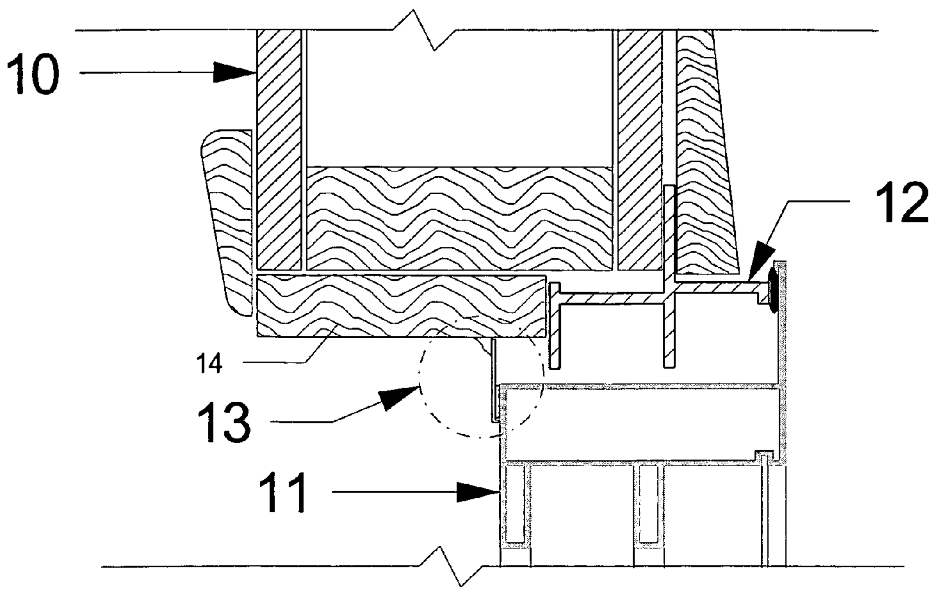
Fig. 1 Prior Art
FIG. 1 is a sectional view of a prior art replacement window installed over an original aluminum window frame.
Figure 2:
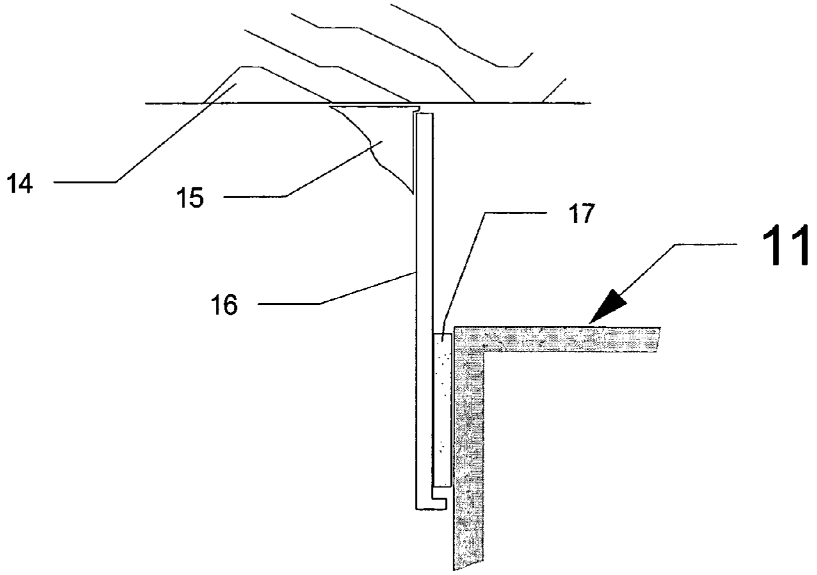
Fig. 2 Prior Art
FIG. 2 is a sectional detail view of the dash-dot circle 13 area of FIG. 1 showing a prior art replacement window trim.
Figure 3:
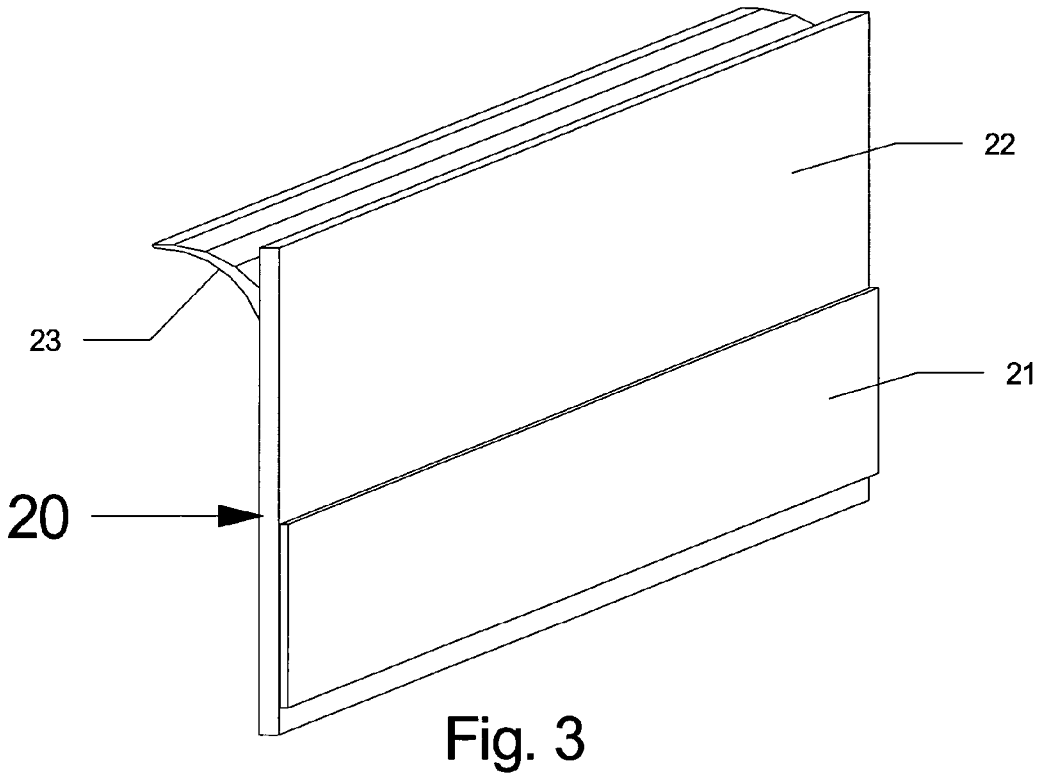
FIG. 3 is an end perspective view of the caulk free window trim.

Turning now to FIG. 3, a caulk free window trim is indicated generally by the reference numeral 20. It is to be appreciated that the caulk free window trim 20 is intended for installation around the entire interior perimeter of a replacement window. Unless otherwise noted, the following description will refer only to the trim as used at the top of the window. The caulk free window trim 20 is an elongated co-extruded shape that includes a vertical rigid first member 22, an angled flexible second member 23 extending from a predetermined intermediate position on first member 22, and a pressure sensitive double sided adhesive strip 21 attached to first member 22 on a side thereof opposite second member 23. Flexible second member 23 shall extend away from and above the uppermost portion of rigid first member 22 to form a predetermined shape. This relationship of flexible second member 23 to the uppermost portion of rigid first member 22 is such to allow for the proper curvature of flexible second member 23 when the caulk free window trim 20 is installed on a replacement window.

Figure 4:
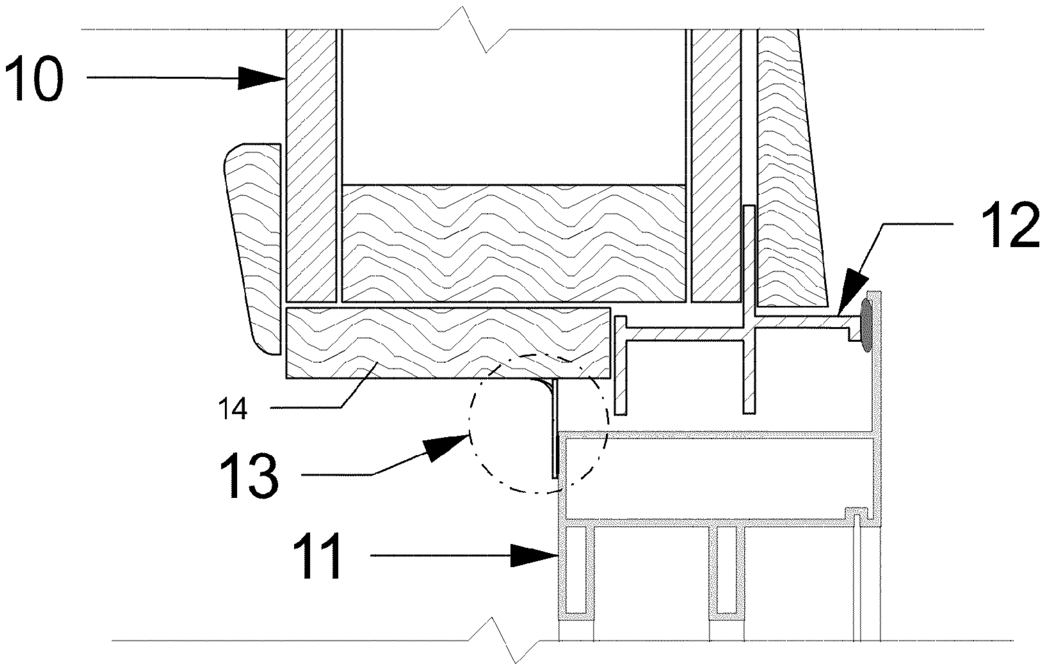
FIG. 4 is a sectional view of a replacement window installed over an original aluminum window frame with the caulk free window trim installed.

Turning now to FIG. 4, the window trim 20 of FIG. 3 is shown installed with respect a typical vinyl replacement window 11 that, in turn, is installed within an existing aluminum window frame 12 attached to a wall 10. A jam liner 14 is attached to the perimeter of the window opening. The dash-dot circle 13 indicates the location of the present invention in relationship to the entire wall-window assembly.

Figure 5:
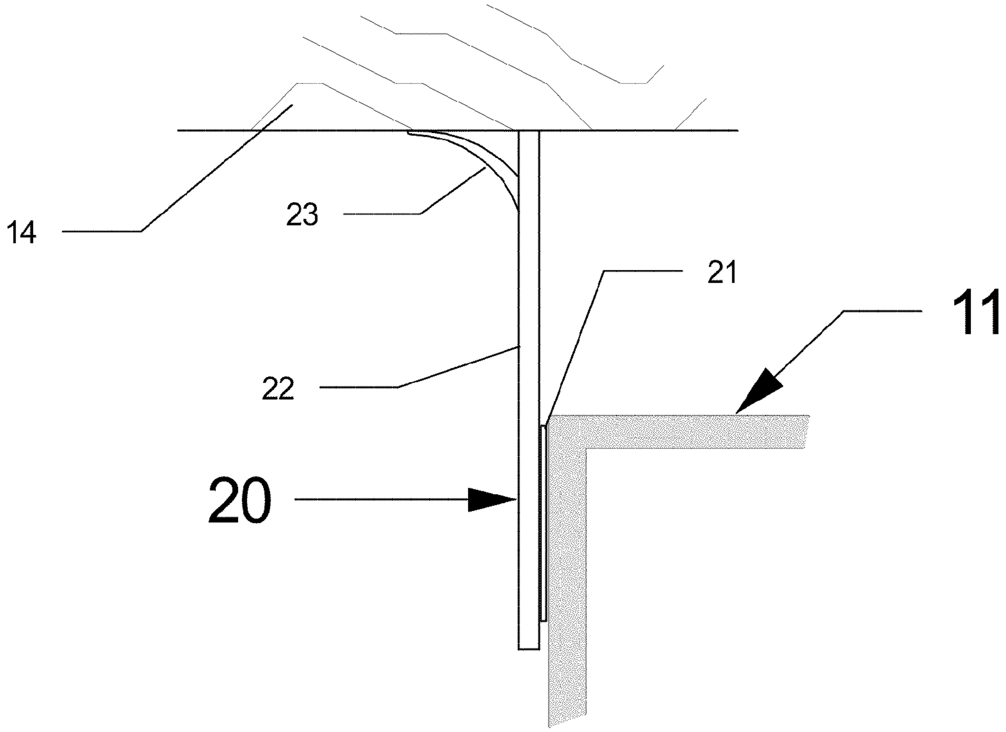
FIG. 5 is a sectional detail view of the dash-dot circle 13 area of FIG. 4 showing the present invention installed on a replacement window.

FIG. 5 is a sectional end view showing the caulk free window trim 20 attached to a replacement window 11 by adhesive strip 21. The upper end of rigid first member 22 is butted up against jam liner 14, this produces a uniform curvature of flexible second member 23 as it also contacts jam liner 14. Caulk free window trim 20 would be cut to the desired length and number of pieces to fit around the interior perimeter of replacement window 11. The ends of caulk free window trim 20 would be miter cut to allow for flexible second member 23 to extend to the corners of jam liner 14. Installation is complete after all pieces of caulk free window trim 20 are installed around the interior perimeter of replacement window 11. No additional finish work is required as with prior art. It is to be appreciated that the caulk free window trim according to the present invention may optionally include decorative features including, but not limited to, a sculptured surface(s), a textured surface(s), a wood grain appearance, and so forth.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A caulk free window trim system comprising:

a replacement window;

a window jamb liner of a window jamb on a wall;

a vertical rigid first member disposing against a portion of the replacement window; and an angled flexible second member extending away from a predetermined intermediate position on said vertical rigid first member and above an uppermost portion of said vertical rigid first member in contact with a portion of the jamb liner to prevent air from infiltrating into the wall between the jamb liner and the replacement window, wherein said system is configured such that the angled flexible member maintains a permanent, fixed location and a permanent, fixed shape while any portion of said replacement window is opening or closing.

2. The caulk free window trim system according to claim 1, further comprising a pressure sensitive double sided adhesive strip attached to said vertical rigid first member on a side thereof opposite said angled flexible second member.

3. The caulk free window trim system according to claim 1, wherein said vertical rigid first member and said angled flexible second member collectively form an elongated co-extruded shape adapted to fit and seal an opening formed between the replacement window and the jamb liner.

4. The caulk free window trim system according to claim 1, wherein a top edge of said vertical rigid first member that is in the uppermost portion of said vertical rigid first member abuts against the jamb liner.

5. The caulk free window trim system according to claim 1, wherein said angled flexible second member is adapted to form a curved shape when the uppermost portion of said vertical rigid first member is in contact with a portion of the jamb liner.

6. The caulk free window trim system according to claim 5, wherein the curved shape simulates a natural curve of caulking.

7. The caulk free window trim system according to claim 1, wherein a curved shape is formed by said angled flexible second member and the curved shape is consistent for a length of said angled flexible second member.

8. The caulk free window trim system according to claim 1, wherein said vertical rigid first member comprises decorative features.

9. The caulk free window trim system according to claim 1, wherein the angled flexible second member is positioned at a predetermined distance from an edge of the vertical rigid first member such that the angled flexible second member maintains a uniform curvature when the angled flexible second member is in contact with the portion of the jamb liner and when the vertical rigid first member is abutted against the jamb liner.

10. A caulk free window trim system comprising:

a replacement window;

a window jamb liner of a window jam on a wall;

a vertical rigid first member covering an opening between the replacement window and the jamb liner and extending past the opening and over a portion of the replacement window; and an angled flexible second member extending away from a predetermined intermediate position on said vertical rigid first member and above an uppermost portion of said vertical rigid first member in contact with a portion of the jamb liner to form an arcuate-shaped edge from the intermediate position on said vertical rigid first member to the position on the jamb liner to prevent air from infiltrating into the wall between the jamb liner and the replacement window;

wherein the system is configured such that the angled flexible second member maintains a permanent, fixed location and a permanent, fixed shape while any portion of said replacement window is opening or closing.

11. The caulk free window trim system according to claim 10, further comprising a pressure sensitive double sided adhesive strip attached to said vertical rigid first member on a side thereof opposite said angled flexible second member.

12. The caulk free window trim system according to claim 10, wherein said vertical rigid first member and said angled flexible second member collectively form an elongated co-extruded shape adapted to fit and seal the opening between the replacement window and the jamb liner.

13. The caulk free window trim system according to claim 10, wherein a top edge of said vertical rigid first member that is in the uppermost portion of said vertical rigid first member abuts against the jamb liner.

14. The caulk free window trim system according to claim 10, wherein the arcuate-shaped edge simulates a natural curve of caulking.

15. The caulk free window trim system according to claim 10, wherein the arcuate-shaped edge is consistent for a length of said angled flexible second member.

16. The caulk free window trim system according to claim 10, wherein said vertical rigid first member comprises decorative features.

17. The caulk free window trim system according to claim 10, wherein the angled flexible second member is positioned at a predetermined distance from an edge of the vertical rigid first member such that the arcuate-shaped edge maintains a uniform curvature when the angled flexible second member is in contact with the portion of the jamb liner and when the vertical rigid first member is abutted against the jamb liner.

18. A caulk free window trim for use in covering a gap formed between a replacement window and a jamb liner, the replacement window being in a wall having a window jamb, the window jamb including the jamb liner, the window trim comprising:

a vertical rigid first member for disposing against a portion of the replacement window and over the gap; and an angled flexible second member extending away from a predetermined intermediate position on said vertical rigid first member and above an uppermost portion of said vertical rigid first member in contact with a portion of the jamb liner, wherein the second member maintains a permanent, fixed position after installation of the window trim and wherein the angled flexible second member is positioned at a predetermined distance from an edge of the vertical rigid first member such that the angled flexible second member maintains a uniform curvature throughout the entire length of the angled flexible second member when the angled flexible second member is in contact with the portion of the jamb liner and when the vertical rigid first member is abutted against the jamb liner.

19. The caulk free window trim according to claim 18, further comprising a pressure sensitive double sided adhesive strip attached to said vertical rigid first member on a side thereof opposite said angled flexible second member.

20. The caulk free window trim according to claim 18, wherein said vertical rigid first member and said angled flexible second member collectively form an elongated co-extruded shape adapted to fit and seal an opening formed between the replacement window and the jamb liner.

21. The caulk free window trim according to claim 18, wherein a top edge adjacent the uppermost portion of said vertical rigid first member abuts against the jamb liner when said vertical rigid first member is disposed against the portion of the replacement window.

22. The caulk free window trim according to claim 18, wherein the curvature simulates a natural curve of caulking.

23. The caulk free window trim according to claim 18, wherein said vertical rigid first member comprises decorative features.

* * * * *